United States Patent [19]

Kashimura et al.

[11] Patent Number: 4,636,034
[45] Date of Patent: Jan. 13, 1987

[54] OPTICAL CONNECTOR FOR OPTICAL FIBER CABLES

[75] Inventors: Noritake Kashimura, Ohmiya; Hiroaki Saitoh, Kawaguchi, both of Japan

[73] Assignee: Dai-Ichi Seiko Co., Ltd., Kawaguchi, Japan

[21] Appl. No.: 719,046

[22] Filed: Apr. 4, 1985

Related U.S. Application Data

[63] Continuation of Ser. No. 443,887, Nov. 23, 1982, abandoned.

[30] Foreign Application Priority Data

Nov. 30, 1981 [JP] Japan ............................... 56-190897

[51] Int. Cl.$^4$ ............................................... G02B 6/36
[52] U.S. Cl. ............................................... 350/96.21
[58] Field of Search ............... 350/96.20, 96.21, 96.23

[56] References Cited

U.S. PATENT DOCUMENTS 4,193,665  3/1980  Arnold ........................... 350/96.22
4,258,977  3/1981  Lukas et al. ..................... 350/96.21

FOREIGN PATENT DOCUMENTS 55-4043    1/1980   Japan .
80/02328  10/1980   PCT Int'l Appl. .
1450760    9/1976   United Kingdom .
1556476   11/1979   United Kingdom .

Primary Examiner—William L. Sikes
Assistant Examiner—Akm E. Ullah
Attorney, Agent, or Firm—Cushman, Darby & Cushman

[57] ABSTRACT

An optical connector for optical fiber cables comprising two ferrules respectively serving to hold end portions of two optical fibers to be connected and a sleeve with a longitudinal through hole having a cross sectional shape of regular hexagon and serving to insert the ferrules thereto, the optical connector being arranged to connect the two optical fibers by respectively inserting the two ferrules to the sleeve from both ends of the sleeve so that the end portions of the two ferrules contact each other in the inside of the sleeve and also arranged that the ferrules can be inserted easily and the ends of the two optical fibers are connected properly.

6 Claims, 4 Drawing Figures

OPTICAL CONNECTOR FOR OPTICAL FIBER CABLES

This is a continuation of application Ser. No. 443,887, filed Nov. 23, 1982, which was abandoned upon the filing hereof.

BACKGROUND OF THE INVENTION

1. Field of the invention

The present invention relates to an optical connector for optical fiber cables.

2. Description of the Prior Art

One of known optical connectors for optical fiber cables has construction as shown in FIG. 1. This optical connector is arranged to insert ferrules 1 and 2, in which optical fibers 10 of optical fiber cables are located and held along the center lines of the ferrules 1 and 2, into a sleeve 3 from both ends of the sleeve 3 so that the ends of the ferrules 1 and 2 contact each other and to thereby connect the ends of the optical fibers.

For the above-mentioned optical connector, it is indispensable to arrange that both optical fibers are accurately aligned with each other, i.e., they come accurately into a straightline. For this purpose, it is essential to arrange that the outer surfaces of the ferrules 1 and 2 are accurately cylindrical and the optical fibers are located accurately on the center lines of the ferrules 1 and 2, the inner surface of the sleeve 3 is also accurately cylindrical and, when the ferrules 1 and 2 are inserted to the sleeve 3, the inner surface of the sleeve 3 contacts the outer surfaces of the ferrules 1 and 2 perfectly closely so that there occurs as far as possible no clearance between said inner surface and said outer surfaces. As a result, the above-mentioned optical connector has such disadvantage that the air in the sleeve 3 does not go out easily when inserting the ferrules 1 and 2 from both ends of the sleeve 3 and, consequently, the ferrules cannot be inserted smoothly.

As a method for eliminating the above-mentioned disadvantage, a small hole 4 may be provided to the sleeve 3 as shown by broken lines in FIG. 1 so that the air goes out through said small hole 4. Even when this method is adopted, it is still not easy to insert the ferrules to the sleeve because of friction between the inner surface of the sleeve and outer surfaces of the ferrules. Moreover, when the sleeve is to be made of synthetic resin, it is difficult to form a sleeve having such small hole.

SUMMARY OF THE INVENTION

It is, therefore, a primary object of the present invention to provide an optical connector for optical fiber cables comprising a sleeve having a longitudinal through hole and two ferrules which are to be inserted to said through hole from both ends of said sleeve and to serve for holding the ends of optical fibers of optical fiber cables, said optical connector for optical fiber cables being arranged that the inner surface of said sleeve contacts the outer surfaces of said ferrules by at least three straight lines which are parallel with and located at equal distance from the center line of said sleeve.

DETAILED DESCRIPTION OF THE PREFERRED EMBODIMENTS

Figure 1:
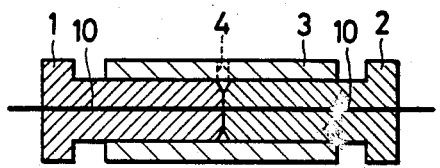
FIG. 1 shows a longitudinal sectional view of a known optical connector taken along the center line thereof.
Figure 2:
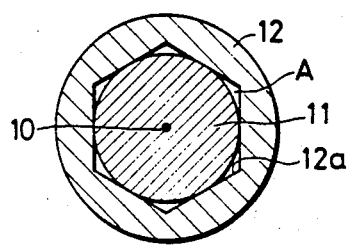
FIG. 2 shows a cross sectional view of Embodiment 1 of the optical connector for optical fiber cables according to the present invention.

Now, the optical connector for optical fiber cables according to the present invention is described below referring to accompanying drawings. In FIG. 2 showing a cross sectional view of Embodiment 1 of the optical connector according to the present invention, numeral 11 designates a ferrule, in which an optical fiber 10 is arranged at the center thereof and which is constructed to have a shape similar to that of the known optical connector shown in FIG. 1. Numeral 12 designates a sleeve having a through hole 12a, which is formed so that the cross sectional shape thereof becomes a hexagon.

The optical connector constructed as described in the above is arranged to connect the optical fibers of optical fiber cables by inserting both ferrules into the sleeve and thereby putting the ends of both ferrules into contact with each other in the same way as the known optical connector. At that time, however, respective ferrules of the optical connector according to the present invention are inserted to the sleeve in the state that the cylindrical outer surface of each ferrule contacts each surface of the hexagonal inner wall of the sleeve only by six straight lines which are in parallel with and located at equal distance from the center line of the sleeve and respective ferrules are thereby centered with each other and with the sleeve. Therefore, the air in the sleeve easily goes out through the spaces formed between the inner wall of the sleeve and outer surfaces of the ferrules (one of said spaces is represented by reference symbol A and FIG. 2).

The cross sectional shape of the through hole of the sleeve is not limited to a hexagon. The shape of said cross section may be a regular triangle, square or any other regular polygon.

Figure 3:
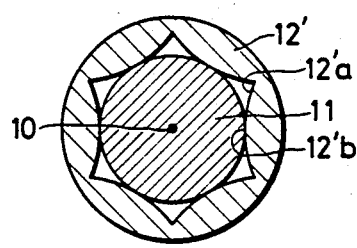
FIG. 3 shows a cross sectional view of Embodiment 2 of the present invention.

FIG. 3 shows a cross sectional view of Embodiment 2 of the optical connector according to the present invention. In this embodiment, the through hole 12′a of the sleeve 12′ is arranged to have a cross sectional shape as shown in the figure, i.e., a modified hexagon each side of which is formed as an arc. This embodiment is thereby arranged that the inner wall of the sleeve and outer surfaces of the ferrules contact only by the straight lines which are in parallel with the center line of the sleeve (i.e., by the top portions of cylindrical convex surfaces 12′b of the inner wall of the sleeve). It is also possible to arrange that the inner wall of the sleeve and outer surfaces of the ferrules contact by straight lines when the ferrules are formed as bar-like members each having a cross sectional shape of regular polygon while the sleeve is formed to have a through hole with a circular cross section.

Figure 4:
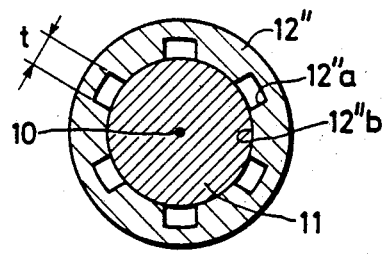
FIG. 4 shows a cross sectional view of Embodiment 3 of the present invention.

FIG. 4 shows a cross sectional view of Embodiment 3 of the optical connector according to the present invention. In this embodiment, grooves 12″a are formed on the inner surface of the sleeve 12″ so that the grooves 12″a extend in parallel with the center line of the sleeve 12″. In case of this embodiment, the air in the sleeve 12″ goes out through the grooves 12″a when the ferrules 11 are inserted to the sleeve 12". Besides, in case of this embodiment, long and narrow surfaces 12"b, which are formed between respective grooves 12"a of the sleeve 12" and which are in parallel with the center line of the sleeve 12", contact the outer surfaces of the ferrules and the ferrules are thereby positioned. When the number of grooves 12"a is increased or the width t of each groove 12"a is made large, in case of this embodiment, it is possible to make the distance between respective grooves small so that the inner surface of the sleeve and outer surfaces of the ferrules contact by portions which are in parallel with the center line of the sleeve and which may be considered substantially as straight lines. This enables to insert the ferrules to the sleeve more easily.

As explained so far, the optical connector for optical fiber cables according to the present invention is arranged that the cross sectional shape of either the inner wall surface of the sleeve or outer surfaces of the ferrules is formed as a regular polygon or a shape similar to a regular polygon. Therefore, when inserting the ferrules to the sleeve, the air in the sleeve goes out easily and it does not become difficult to insert the ferrules because of the pressure of the air in the sleeve. Besides, as the optical connector according to the present invention is arranged that the inner wall of the sleeve and outer surfaces of the ferrules contact at a plural number of places by portions which are parallel with the center line of the sleeve and which may be regarded substantially as straight lines, resistance to be caused by friction and the like when inserting the ferrules to the sleeve is extremely small. Therefore, even when the sleeve and ferrules are formed very accurately so that they reliably contact each other, it is possible to insert the ferrules to the sleeve quite easily. Moreover, as the sleeve and ferrules of the optical connector according to the present invention are arranged to have such shapes that enable to produce the sleeve and ferrules easily by molding work of synthetic resins, it is possible to produce the optical connector with extremely high accuracy by using synthetic resins as materials.

We claim:

1. An optical connector for optically connecting respective ends of two optical fibers of two respective optical fiber cables, said optical connector comprising:

a first ferrule molded of synthetic resin, this ferrule having two axially opposite ends and being constructed and arranged to receive an end portion of a first optical fiber so that the said respective end thereof is exposed at the axially inner said end of this ferrule and said end portion of the first optical fiber extends longitudinally within this ferrule;

a second ferrule molded of synthetic resin, this ferrule having two axially opposite ends and being constructed and arranged to receive an end portion of a second optical fiber so that the said respective end thereof is exposed at the axially inner said end of this ferrule and said end portion of the second optical fiber extends longitudinally within this ferrule; and a tubular sleeve molded of synthetic resin, this sleeve being axially open at two opposite ends thereof and being constructed and arranged to have said first and second ferrules slid axially thereinto through respective ones of said opposite ends thereof until said respective ends of said two optical fibers, when said end portions are received in said ferrules as aforesaid are aligned in juxtaposition so that within said optical connector, each of said two optical fibers is positioned to effectively form an optical continuation of the other;

each of said ferrules having external surface means defining a portion of full circumferential extent which is of uniform transverse cross-sectional shape along the length of each such portion;

said sleeve having internal surface means defining a portion of full circumferential extent which is of uniform transverse cross-sectional shape along the length of such portion;

one of said internal surface means portion and said external surface means portions being effectively grooved by at least one groove means formed along the full longitudinal extent of telescopic overlap of said portions when said ferrules are axially slid into said sleeve as aforesaid that air otherwise trapped between said ferrules as said ferrules are being slid into said sleeve escapes axially outwardly of said optical connector via said groove means;

said internal surface means portion and external surface means portion being so sized and shaped relative to one another that frictional resistance to axial sliding of said ferrules into said sleeve as aforesaid is extremely small, so that said sleeve need not be distended as said ferrules are axially slid thereinto.

2. An optical connector for optical fiber cables according to claim 1 wherein said inner surface means of said sleeve is formed to have a cross sectional shape of a regular polygon and said outer surface means of both of said two ferrules are formed to have a circular cross sectional shape.

3. An optical connector for optical fiber cables according to claim 2 wherein said inner surface mean of said sleeve is formed to have a cross sectional shape of regular hexagon.

4. An optical connector for optical fiber cables according to claim 2 wherein said inner surface means of said sleeve is formed to have a circular cross sectional shape and said outer surface means of both of said two ferrules are formed to have a cross sectional shape of a regular polygon.

5. An optical connector for optical fiber cables according to claim 4 wherein said outer surface means of both of said ferrules are formed to have a cross sectional shape of regular hexagon.

6. An optical connector for optical fiber cables according to claim 1 wherein at least either of said inner surface means of said sleeve or said outer surface means of said ferrules has longitudinal concave portions.

* * * * *